United States Patent Office 3,437,737
Patented Apr. 8, 1969

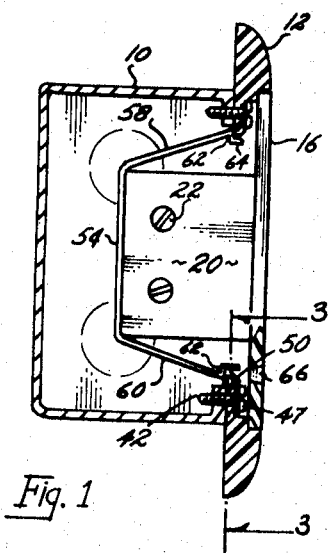

3,437,737
MODULAR UNIT OUTLET
Milan Francis Wagner, 3248 Stoddard Ave.,
San Bernardino, Calif. 92405
Filed Oct. 11, 1965, Ser. No. 494,761
Int. Cl. H01r 13/46; H01h 9/02
U.S. Cl. 174—55
6 Claims

ABSTRACT OF THE DISCLOSURE

Apparatus including a back plate that is detachably but securely connected to an outlet box, the back plate being apertured and having recessed tapered ledges to receive the front plate of a modular electrical unit having flexible arms snapping under the ledges but releasable by means of an instrument inserted through an opening in the front plate.

---

This invention relates generally to module type electrical outlets and to the adjustable manner of hanging the back plate and quick snap-in arrangement of the electrical module.

One of the main objects of the invention is in the provision of an adjustable back plate and quick detachable module structure that increases flexibility of use and arrangement.

Another object of the invention is to provide a back plate and detachable module structure arranged for adjustable attachment to compensate for poor outlet box positioning and surface finish.

Yet another object of the invention lies in the provision of a snap-in and quickly removable electrical module that permits interchangeability to any type of outlet or switch.

These and other objects and advantages of the present invention will become apparent to those skilled in the art upon consideration of the following detailed description of the preferred embodiment thereof, reference being made to the accompanying drawings, herewith, wherein:

FIGURE 1 is a sectional view of the device;
FIGURE 2 is an isometric or exploded view of the apparatus;
FIGURE 3 is an enlarged partial sectional view showing the attachment of the ground clip;
FIGURE 4 is a perspective view of the module from the rear;
FIGURE 5 is a plan view of the back plate;
FIGURE 6 is a perspective view of the ground clip; and
FIGURE 7 shows the device as installed.

Prior applications have been filed by me in which detachable electrical modules have been associated with the back plate and outlet box. These applications bear serial numbers as follows: (Snap-In Switch and Receptacle Units and Back Plates, filed Jan. 15, 1965, Ser. No. 425,859 now abandoned) also (Hook-In Switch and Receptacle Modules and Back Plates, filed Aug. 13, 1965, Ser. No. 479,558 now abandoned).

The fundamental theory of the present invention is to provide a special back plate that is easily attached in an adjustable manner to the conventional electrical outlet box and also to provide a quick attachable and detachable electrical module for the plate. The adjustable feature is accomplished by slotting and recessing one of the ledges of the frontal face plate so that it may be loosely hung and laterally positioned on an outlet box before final securement. The quick detachable feature is accomplished by a module attached spring type back strap that snaps under slanted face plate ledges, one of which has a clip that retains one end of the back strap, and can be released by a tool inserted through an opening in the frontal plate and the module withdrawn from the outlet box.

The drawings disclose certain elements of a wall or otherwise attached electrical outlet unit. An outlet box 10 is wall or otherwise secured in the usual manner. A back plate 12 is adapted to be secured about the outlet box and an electrical module 14 attached to the plate 12. The module 14 has a frontal plate 16 which may have any type of plug-in apertures 18 or switch. A conventional housing 20 contains the standard mechanical parts and dual sets of terminal screws 22.

The present invention is directed to the modification of the above elements to provide a new and novel structure that has advantages of attachment and use.

The back plate 12 has shallow ledges 24 and 26 which support the ends of the frontal plate 16. Both of the ledges 24 and 26 are slanted inwardly at 28 and 30 respectively, for easy insertion and removal of the electrical module as will be later explained. The ledge 26 has a connecting longitudinal slot 32 and a lateral slot 34 so that the back plate can be hung on and loosely associated with an attachment screw 36 receivable in a threaded opening 38 in the outlet box 10. The slots 32 and 34 have a surrounding recess 35 to accommodate the head of the screw 36.

The ledge 24 is recessed at 40 and has an aperture 42 that coincides with a threaded screw reception portion 44 in the outlet box 10. A clip has a base 46 that rests on recess 40 with an aperture 48 therein, being in alignment with the aperture 42 so that an attachment screw 47 may fixedly secure the back plate 12 and ground clip to outlet box 10. The clip base 46 has an intermediate portion 50 resting on the slanted edge of the ledge 28 and a latch lip 52 that lies under the ledge. The ground clip then becomes an integral part of the back plate.

The back plate 12 is affixed to the outlet box 10 by means of attachment screws 36 and 47. The module 14 is received into the back plate 12 so that the substantially horizontal portions of the back strap latch arms 62 seat under the opposing slanted ledges 28 and 30. With the attachment means 47 placed through aligned apertures 42 and 48 received into threaded portion 44 of outlet box 10, the clip as such is mechanically attached and by means of pressure exerted against the ground clip by the latch arm of the back strap the mechanical ground continuity is thus provided for module ground requirements. The opposing internal back plate ledges are slanted and necessarily so to accomplish the quick and easy removal of the module.

A back strap 54 is secured to the base of the module at 56 and has upwardly and outwardly extending spring tension arms 58 and 60. The latch portion of the arms 58 and 60 are identical and include inwardly bent substantially horizontal portions 62 and upstanding edges 64. The latch ends of the arms 58 and 60 slide down the slanted sides of the back plate and snap at one side under the ledge 26 and at the other side under the latch lip 52. An aperture 66 in the frontal plate 16 permits the inserting of a sharp tool to thrust the latch portion of the spring arm 60 inwardly to release one end of the module whereby the other side will be automatically released.

The shape of the back plate may be varied as desired. There may be several quick detachable gangs disposed therein. The loose slot for adjustably securing the back plate to the outlet box may be modified if desired as long as the screw hanging and adjustable feature is retained.

The operation of the device is relatively simple. The back plate due to its slotted and loose fitting may be adjustably attached quickly to the outlet box. Snap in of the electrical module under the slanted ledges in spring tensioned manner and released by insertion of a tool to release one of the latch ends is readily accomplished and an entirely new and novel result is attained.

While I have described in considerable detail what I believe to be the preferred form of my invention, it will be understood by those skilled in the art that various changes may be made in the shape and arrangement of the several parts without departing from the broad scope of my invention as defined in the following claims.

I Claim:

1. A modular unit outlet, comprising:
   an outlet box;
   a back plate fixedly attached to the outlet box, said back plate having,
   a modular unit receiving back plate opening having at least two recessed opposed ledges, said ledges having, at least one of their inner edges tapered toward the opening in the back plate;
   a modular front plate lying within the back plate opening and on the ledges and having an electrical fixture fixedly attached thereto;
   flexible arms slanting outwardly attached to the electrical fixture and having upper edges snapping under the tapered ledges and having at least one release element extending into the cover plate opening; and
   an instrument inserting opening in the front plate in position for tripping of the release element by means of a manual tool causing detachment of the modular front plate and attached electrical fixture.

2. A device as set forth in claim 1 in which a detachment member seated in the ledges secures the back plate to the outlet box.

3. A device as set forth in claim 2 in which the detachment member has an adjustable connection with the outlet box.

4. A device as set forth in claim 3 in which the ledges are apertured and recessed for seating the detachment member in adjustable position.

5. A device as set forth in claim 2 in which a clip connects at least one detachment member and surrounds the tapered edge to engage a flexible arm of the electrical fixture and provides electrical ground continuity when a non-conductive back plate is used.

6. A device as set forth in claim 2 in which the ledges and the detachment members are so arranged that the modular front plate lies flush with the back plate.

References Cited

UNITED STATES PATENTS

| | | | |
|---|---|---|---|
| 1,933,358 | 10/1933 | Almerantz | 174—57 |
| 2,888,537 | 5/1959 | Mears | 200—168 |
| 3,119,895 | 1/1964 | Palmer | 339—122 |

FOREIGN PATENTS

| | | |
|---|---|---|
| 817,473 | 10/1951 | Germany. |
| 878,078 | 6/1953 | Germany. |

LEWIS H. MYERS, *Primary Examiner.*

DAVID A. TONE, *Assistant Examiner.*

U.S. Cl. X.R.

174—66